United States Patent
McNulty

(10) Patent No.: US 7,864,415 B2
(45) Date of Patent: Jan. 4, 2011

(54) USE OF A FOCUSING VORTEX LENS AS THE OBJECTIVE IN SPIRAL PHASE CONTRAST MICROSCOPY

(75) Inventor: Ian McNulty, Plainfield, IL (US)

(73) Assignee: U Chicago Argonne, LLC, Chicago, IL (US)

( * ) Notice: Subject to any disclaimer, the term of this patent is extended or adjusted under 35 U.S.C. 154(b) by 390 days.

(21) Appl. No.: 11/856,403

(22) Filed: Sep. 17, 2007

(65) Prior Publication Data

US 2009/0135486 A1    May 28, 2009

(51) Int. Cl.
    *G02B 21/00* (2006.01)
(52) U.S. Cl. .................... 359/370; 359/368; 359/385; 359/565
(58) Field of Classification Search ......... 359/368–390, 359/558–576
    See application file for complete search history.

(56) References Cited

U.S. PATENT DOCUMENTS

| | | | | |
|---|---|---|---|---|
| 3,542,453 A | * | 11/1970 | Kantor | 359/565 |
| 4,210,391 A | | 7/1980 | Cohen | |
| 5,550,887 A | * | 8/1996 | Schmal et al. | 378/43 |
| 6,580,518 B2 | * | 6/2003 | Eda et al. | 356/609 |
| 6,643,065 B1 | * | 11/2003 | Silberman | 359/573 |
| 6,686,591 B2 | * | 2/2004 | Ito et al. | 250/311 |
| 6,917,472 B1 | | 7/2005 | Yun et al. | |
| 7,119,953 B2 | | 10/2006 | Yun et al. | |
| 7,466,796 B2 | * | 12/2008 | Bloom | 378/43 |

OTHER PUBLICATIONS

C. Chang, A. Sakdinawat, P. Fischer, E. Anderson, and D. Attwood, "Single-element objective lens for soft x-ray differential interference contrast microscopy," Opt. Lett. 31, 1564-1566 (2006).
V. Aristov, M. Chukalina, A. Firsov, T. Ishikawa, S. Kikuta, Y. Kohmura, A. Svintsov, and S. Zaitsev, "X-ray optics for phase differential contrast: design, optimization, simulation, fabrication," eds. W. Meyer-Ilse, T. Warwick, and D. Attwood, AIP Conference Proc. CP507, 554 (2000).

* cited by examiner

*Primary Examiner*—Thong Nguyen
(74) *Attorney, Agent, or Firm*—Joan Pennington

(57) ABSTRACT

A method and objective apparatus are provided for implementing an enhanced phase contrast microscope. A focusing vortex lens, defined by a diffractive spiral zone plate (SZP) lens, is used for the objective for the phase contrast microscope. The SZP lens focuses and imparts a helical phase to incident illumination to image the specimen with spiral phase contrast. The spiral phase contrast microscope is sensitive to phase gradients in all sample axes. Replacing the objective of a microscope with the diffractive SZP lens of the invention immediately provides existing instruments with spiral phase contrast capability.

17 Claims, 10 Drawing Sheets

300

400

500

700

800

USE OF A FOCUSING VORTEX LENS AS THE OBJECTIVE IN SPIRAL PHASE CONTRAST MICROSCOPY

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to an improvement in phase contrast microscopy, and a method and apparatus for implementing an enhanced phase contrast microscope.

DESCRIPTION OF THE RELATED ART

Phase contrast microscopy is widely used to image the structure of weakly absorbing objects with many types of radiation, such as visible light, electrons, x-rays, neutrons, and the like. The most popular methods used for phase contrast microscopy are based on those of Zernike and Nomarski. Other methods are based on defocus, configured detectors, interferometry, holography, or coherent diffraction.

Phase contrast microscopy is used for making visible differences in phase or optical path in transparent or reflecting specimens. It is important for studying cells and for this reason is widely used in biological and medical research.

U.S. Pat. No. 6,917,472 to Yun et al. issued Jul. 12, 2005, discloses an achromatic Fresnel optic (AFO) that combines a Fresnel zone plate and a refractive Fresnel lens. The zone plate provides high resolution for imaging and focusing, while the refractive lens takes advantage of the refraction index change properties of appropriate elements near absorption edges to recombine the electromagnetic radiation of different energies dispersed by the zone plate. This compound lens effectively solves the high chromatic aberration problem of zone plates. The AFO has a wide range of potential applications in lithography, microimaging with various contrast mechanisms and measurement techniques.

U.S. Pat. No. 4,210,391 to Cohen issued Jul. 1, 1980, discloses a multifocal Fresnel lens construction suitable for use in optical systems with multifocal requirements. The multifocal Fresnel lens is designed as a multifocal zone plate to allow an annular ring construction that is not width limited by diffraction aberrations. This is accomplished by modifying the phase separating annular rings of a zone plate, with curved or inclined optical facets of varying refractive indices, which can then function as Fresnel rings corresponding to the different focal powers desired.

U.S. Pat. No. 7,119,953 to Yun et al. issued Oct. 10, 2006, discloses a phase contrast x-ray microscope that has a phase plate that is placed in proximity of and attached rigidly to the objective to form a composite optic. This enables easier initial and long-term maintenance of alignment of the microscope. In one example, they are fabricated on the same high-transmissive substrate. The use of this composite optic allows for lithographic-based alignment that will not change over the lifetime of the instrument. Also, in one configuration, the phase plate is located between the test object and the objective.

A significant practical problem for phase contrast microscopy is to find an effective way of separating the incident or direct light from that diffracted by the object. Most methods for accomplishing this require either separate phase plate or analyzer optics distinct from the microscope objective lens. The phase plates used for Zernike phase contrast microscopy are wavelength specific and require precise alignment. The analyzer optics used in differential interference (Nomarski) phase contrast microscopy are sensitive only to phase gradients along a single axis in the sample. Phase contrast by means of defocus comes at the expense of object resolution. A coherent reference wave, or iterative phase retrieval and a priori information, is required to image the object phase by coherent diffraction. These restrictions limit the chromatic range of the microscope, the imaging resolution, the types of sources that can be used, and the types of objects that can be imaged with phase contrast.

Important aspects of the present invention are to provide a method and apparatus for implementing an enhanced phase contrast microscope, to provide such improved method and apparatus substantially without negative effect and that overcome some of the disadvantages of prior art arrangements.

SUMMARY OF THE INVENTION

In brief, a method and objective apparatus are provided for implementing an enhanced phase contrast microscope. A focusing vortex lens is used for the objective in the phase contrast microscope. The focusing vortex lens is defined by a diffractive spiral zone plate (SZP) lens. The diffractive SZP lens focuses and imparts a helical phase to incident illumination to image the specimen with spiral phase contrast. The spiral phase contrast microscope is sensitive to phase gradients in all sample axes.

In accordance with features of the invention, the functions of focusing and forming the helical phase are combined into the SZP lens, a single optical element. Replacing the objective of a microscope with the SZP lens of the invention immediately provides existing instruments with spiral phase contrast capability.

In accordance with features of the invention, the invention provides a simple, efficient, and inexpensive enhancement of standard microscopes and microscopy methods by adding spiral phase contrast capability. The focusing vortex lens is substituted for the usual objective lens in a standard microscope generally without requiring other changes to the microscope. Conventional methods of phase contrast microscopy require additional optics, coherent sources, reference waves, or iterative methods in addition to the usual equipment used by microscopes.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a micron-scale full-field spiral phase microscope is provided with a hard x-ray beam replacing the microscope objective lens with a focusing vortex lens. A refractive focusing vortex lens has helical phase steps fabricated into the curved surface of a conventional refractive lens. A diffractive focusing vortex lens has phase-shifting spiral zones instead of the circular zones in a conventional diffractive lens. Both types of lenses focus and impart a helical phase to the incident illumination. This helical phase allows the object to be imaged with azimuth-independent phase contrast and without additional optics, source requirements, reference waves, or iterative methods. A significant and principal benefit of this method is that it is applicable to all microscopes by substituting a focusing vortex lens in place of the usual objective lens. Advantages of this method hold for practical full-field x-ray microscope and this optical method advantageously is adopted for spiral phase imaging with other particles such as neutrons, atoms, and electrons.

Conventional methods of phase contrast microscopy require additional optics, coherent sources, reference waves, or iterative methods in addition to the usual equipment used by microscopes. These restrictions limit the chromatic range of the microscope, the imaging resolution, the types of sources that can be used, and the types of objects that can be imaged with phase contrast. This invention seeks to solve these problems by adding phase contrast capability to existing microscopes without the above restrictions on their utility.

In accordance with features of the invention, a method is provided that is applicable to all microscopes by substituting a focusing vortex lens in place of the usual objective lens without requiring other changes to the microscope. The invention provides a simple and inexpensive enhancement of standard microscopes and microscopy methods by adding phase contrast capability. Uses for this method include phase contrast imaging in electron microscopes and with neutrons, atoms, and other particles as well as visible light and x-rays.

Figure 1A:
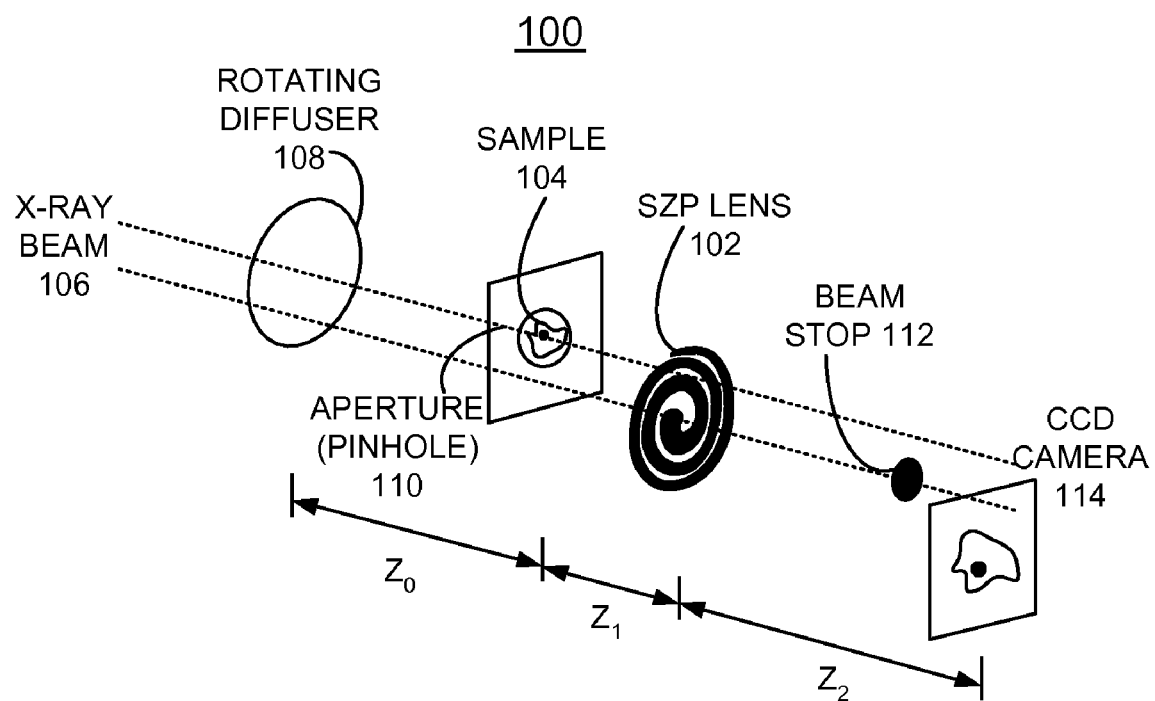
FIGS. 1A and 1B are schematic diagrams illustrating apparatus for implementing an enhanced phase contrast microscope in accordance with the preferred embodiment.
Figure 1B:
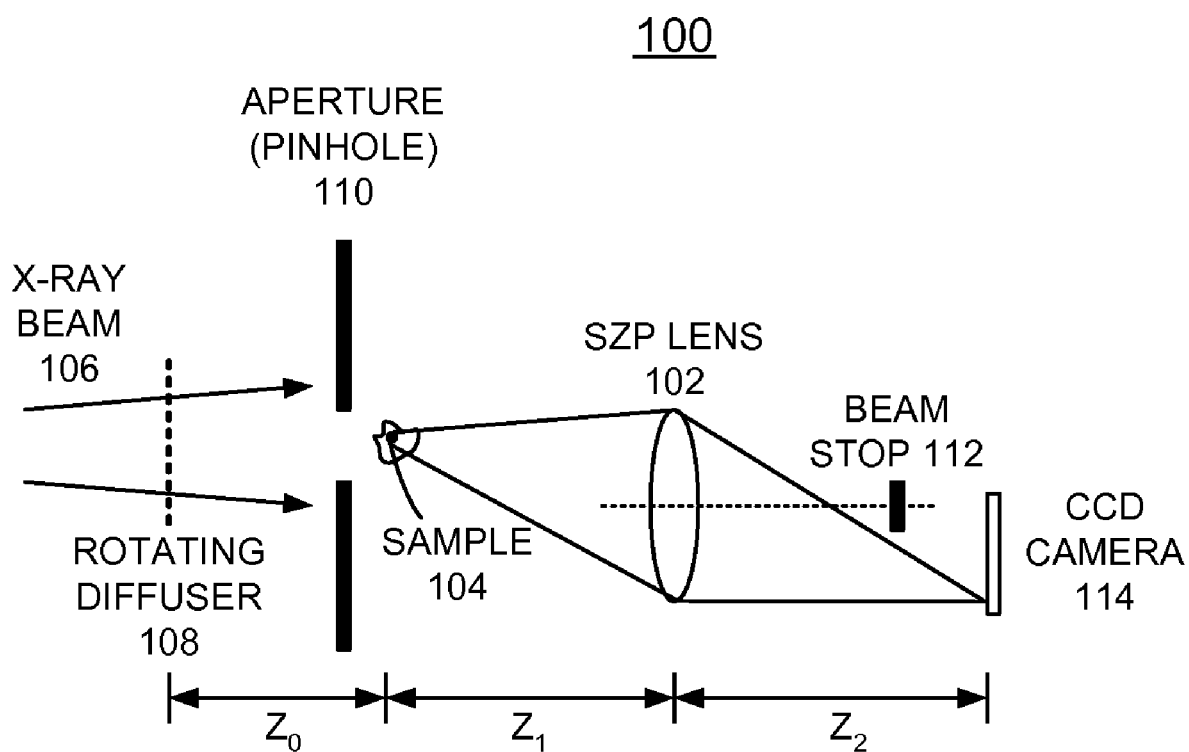

Having reference now to the drawings, FIGS. 1A and 1B are schematic diagrams illustrating objective apparatus or optics generally designated by the reference character 100 and arranged in accordance with the preferred embodiment for implementing an enhanced phase contrast microscope.

Objective apparatus 100 includes a focusing vortex lens 102 used for the objective for a phase contrast microscope. The focusing vortex lens 102 is defined by a diffractive spiral zone plate (SZP) lens 102 positioned a set distance indicated by an arrow labeled Z1 from a specimen or sample 104.

In accordance with features of the invention, the focusing vortex lens 102 focuses and imparts a helical phase to the incident illumination. This helical phase allows the object to be imaged with azimuth-independent phase contrast and without additional optics, source requirements, reference waves, or iterative methods. A principal benefit of this method is that it is applicable to all microscopes by substituting a focusing vortex lens 102 in place of the usual objective lens.

As shown in FIGS. 1A and 1B, objective apparatus 100 includes an x-ray beam 106 coupled by an optional rotating diffuser 108 and an order sorting aperture (OSA) or pinhole 110 to the specimen or sample 104. The optional diffuser 108 is a rotating diffuser producing spatially incoherent illumination. The pinhole 110 defines a sample field of view. Objective apparatus 100 includes a beam stop 112 positioned between the SZP lens 102 and a charge coupled device (CCD) camera 114.

As best illustrated in FIG. 1B, the SZP lens 102 images off-axis of the sample 104 onto the CCD camera 114. The magnification of the sample image by the SZP lens 102, for example equal to 4, is represented by $z_2/z_1$, where $z_1$ represents the distance from the sample 104 to the SZP lens 102, and $z_2$ represents the distance from the SZP lens 102 to an image plane of the CCD camera 114. As shown in FIGS. 1A and 1B, $z_0$ represents the distance from the diffuser 108 to the sample 104. For example, objective apparatus 100 may include z0=4 m, $z_1$=31 cm, and $z_2$=1.25 m, and with SZP lens 102 having a focal length, f=24.95 cm. The sample image is magnified, for example 10× by objective lens of the CCD camera 114.

Figure 2:
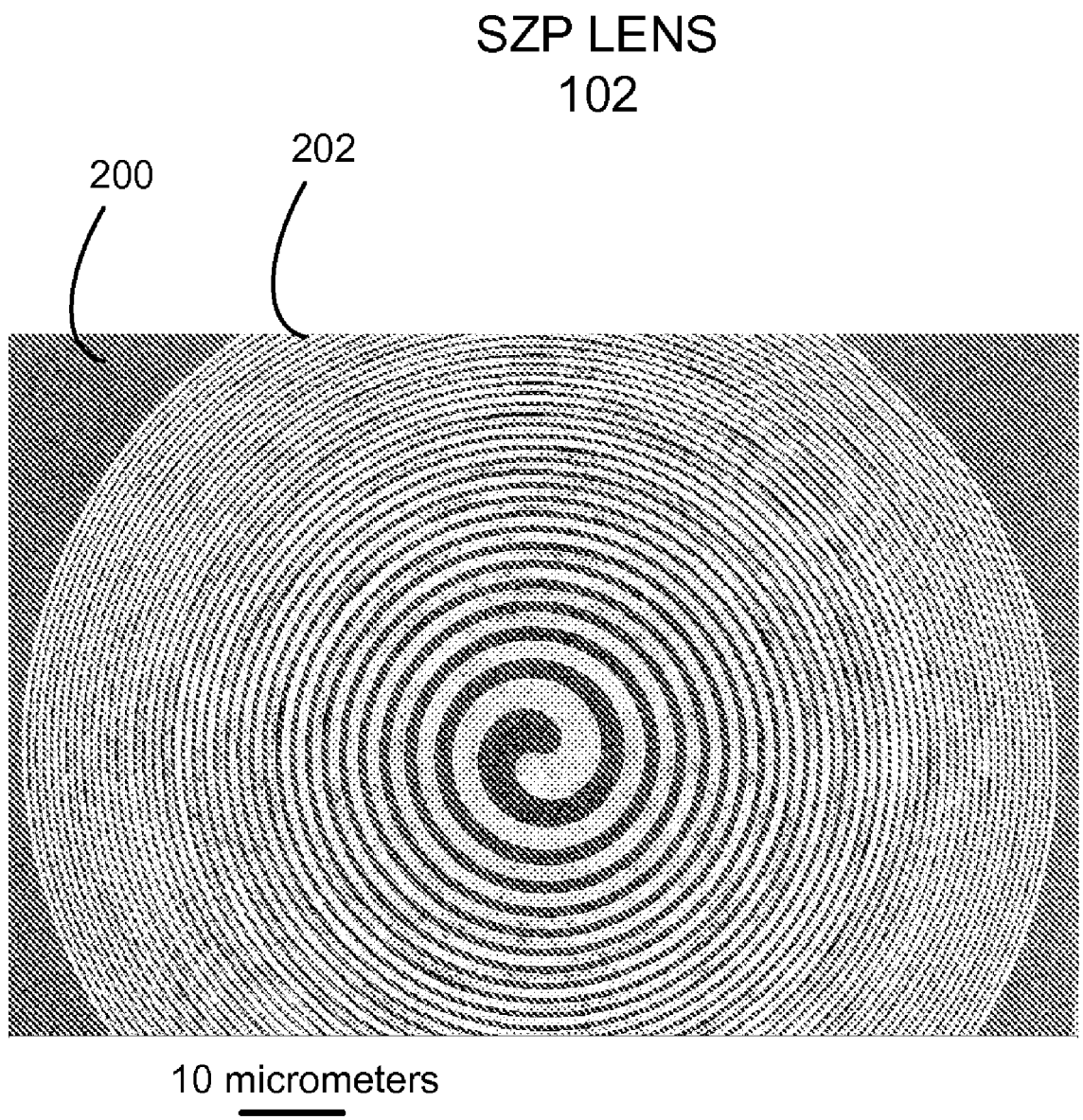
FIG. 2 illustrates an example spiral zone plate lens in accordance with the preferred embodiment.

Referring also to FIG. 2, an exemplary SZP lens 102 of the preferred embodiment is illustrated. SZP lens 102 is formed, for example, by conventional electron beam nanolithography including a substrate 200 with a spiral pattern 202. A prototype vortex lens is about 100 micrometers ($100 \times 10^{-6}$ m) in diameter. The prototype lens 102 has a spiral pattern and is about 1 μm thick and made of gold on a silicon nitride substrate, providing a focal spot size of about 400 nm ($400 \times 10^{-9}$ m). The prototype lens 102 was tested with hard x-rays, or approximately 9 keV x-rays. A similar prototype lens made of nickel, 150 nm thick, was tested with soft x-rays, or approximately 1.8 keV x-rays. SZP lens 102 is applicable over a wide range, for example, from 0.2 keV (soft) to 20 keV (hard) x-rays.

While the prototype vortex lens were made for x-rays, it should be understood that the SZP lens 102 of the preferred embodiment can be used with other particles, such as electrons, neutrons, and atoms.

In accordance with features of the invention, the unique method of separating the direct light from the light diffracted by a specimen in the microscope is much more sensitive to weakly absorbing specimens. For example, the imaging resolution using this method can be increased to a range of 10 nm ($10^{-9}$ m) by using vortex lenses with finer spiral zones.

Waves containing phase singularities are described by Laguerre-Gaussian modes characterized by a helical phase term, $\exp(il\phi)$, where l is the topological charge of the helix. In spiral phase contrast experiments with visible light, non-focusing diffractive elements are typically used to introduce a l=1 singularity into the Fourier plane of the optical system. This is not a practical approach for x-rays because of the low efficiency Fourier-transforming optical elements. Introducing phase singularities into x-ray beams, the diffractive spiral zone plate (SZP) lens 102 is used both to image the specimen 106 and produce the phase singularity.

An experimental setup has been provided that relies on only a single image-forming element or SZP lens 102 and no other filters, such as Zernike phase rings or Hilbert transforming elements. The charge of the singularity depends only on the spiral topology. The propagator in the transfer function for a SZP lens consists of that for a conventional lens, exp(−ikt²/2f), modified by the helical phase term:

$$A_{SZP}(r, \phi) \propto \exp\left(i\ell\phi - \frac{ikr^2}{2f}\right)$$

where k=2π/λ is the wave number for wavelength λ, r and ϕ are the radial and azimuthal coordinates, and f is the focal length of the lens. The helical term converts spatial derivatives of the absorption and phase in the sample to intensity differences at the image plane. A charge 1 singularity enables access to the phase gradient; higher derivatives of the specimen phase can be accessed via higher helical charges. This azimuthally symmetric generalization of differential interference contrast may be compared to the sensitivity to linear gradients achieved by use of Wollaston prisms in a Normarski contrast microscope. Because the helical term is rotationally invariant the effect is isotropic: there is no preferred alignment between the object and imaging system as there is when using twin or split zone plates. Spiral phase microscopy is sensitive to phase gradients along any axis, allowing visualization of feature edges at arbitrary orientations.

It is well known that the spatial resolution of a lens of radius R is ~l/NA for numerical aperture NA=2R/f, in the small-NA limit. Because waves from diametrically opposite regions of a SZP have opposite phase they cancel on-axis, producing an annular focus with a radius $(l/2)^{1/2}$ times the focal waist of an ordinary zone plate. The resolution of a SZP is therefore approximately equal to $(2l)^{1/2} d_r$, where $d_r=\pi f/kR$ is the width of the finest zone. Specifically, a charge 1 SZP samples differences in sample absorption and phase over length scales of ~λ/NA with a resolution ~1.4 λ/NA, a relatively small price to pay. Since waves that are plane on this scale do not contribute to the image, the enhancement of sample absorption and phase gradients is significant.

The diffraction efficiency of x-ray zone plates depends on the material composing the zones, their thickness and precision with which they are fabricated, and the x-ray energy, whether the ordinary or spiral type. Hard x-ray zone plates with 1 μm thick gold zones have ~20% efficiency at 9 keV photon energy; somewhat less than the theoretical efficiency is typical due to imperfections in the zones.

For the spiral phase contrast experimental setup, a full-field transmission microscope geometry was used at the 34-ID-C undulator beamline at the Advanced Photon Source (APS) at Argonne National Laboratory (ANL). The undulator source and beamline monochomator were set for an x-ray photon energy of 9.1 keV (λ=1.36 Å). The monochromaticity λ²/Δλ of the beam was ~7000 using a Si(111) double-crystal monochromator. The transverse coherence width of the beam was approximately 20 μm, as selected by a pair of polished slits.

The diffuser 108 was implemented by a rotating diffuser consisting of 6 paper tissue disks fixed to the axis of a small electric fan could deployed in the beam following the slits to make the illumination pseudothermal, or spatially incoherent, over time scales of seconds. The microscope specimen or sample 104 was located $Z_0$ approximately 4 m downstream of the diffuser 108. It consisted of a 20 μm diameter pinhole 110, the sample 104, the SZP lens 102 used as an objective, and an x-ray sensitive CCD camera 114. The camera 114 detected the sample image by means of a YAG:Ce scintillator crystal, imaged by a 20× objective lens onto a Peltier-cooled CCD camera with 1536×1024 9-μm square pixels.

The locations of the sample 104, SZP lens 102, and camera 114, with relative distances $Z_1$ and $Z_2$ as shown in FIGS. 1A and 1B were chosen to satisfy the focal condition according to the thin-lens formula, $1/f=1/z_1+1/z_2$, where $f=2d_rR/\lambda$, $d_r$ is the finest zone width, and R is the radius of the SZP lens 102. At 9.1 keV the focal length of the SZP lens 102 was 24.6 cm, $z_1$ was 31 cm, and $z_2$ was 1.25 m. The 1 μm thick Au features 202 of the SZP lens 102 were calculated by the method of Heckenberg and fabricated by electron-beam nanolithography on 50-nm thick $Si_3N_4$ membranes. The structures were 100 μm in diameter with a finest zone width of 340 nm.

Figure 3:
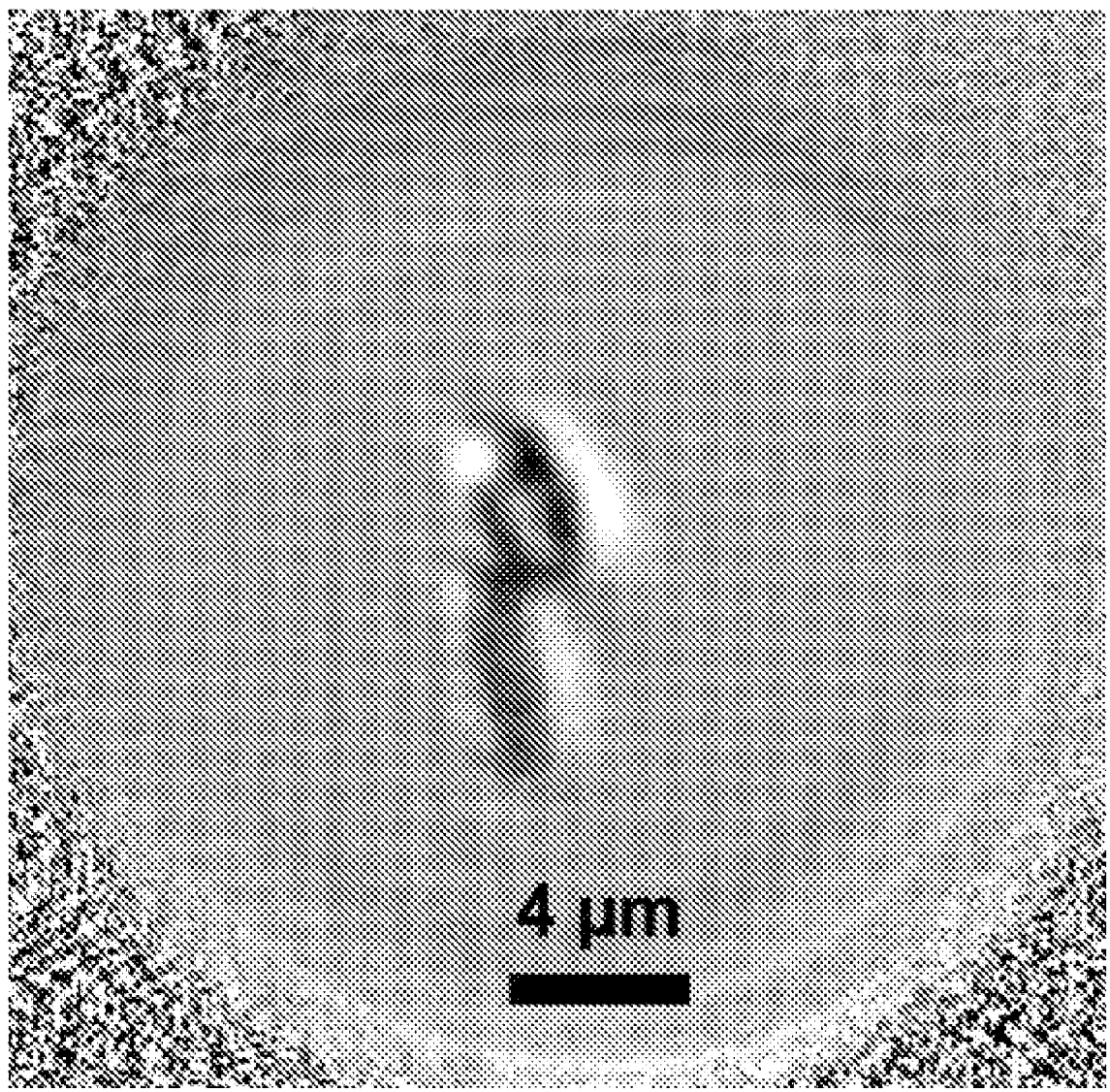
FIG. 3 is an x-ray spiral phase contrast micrograph of a silicaceous diatom using 9.1 keV x-rays, the apparatus in FIG. 1, the spiral zone plate lens of FIG. 2, and with the diffuser present in the apparatus.
Figure 4:
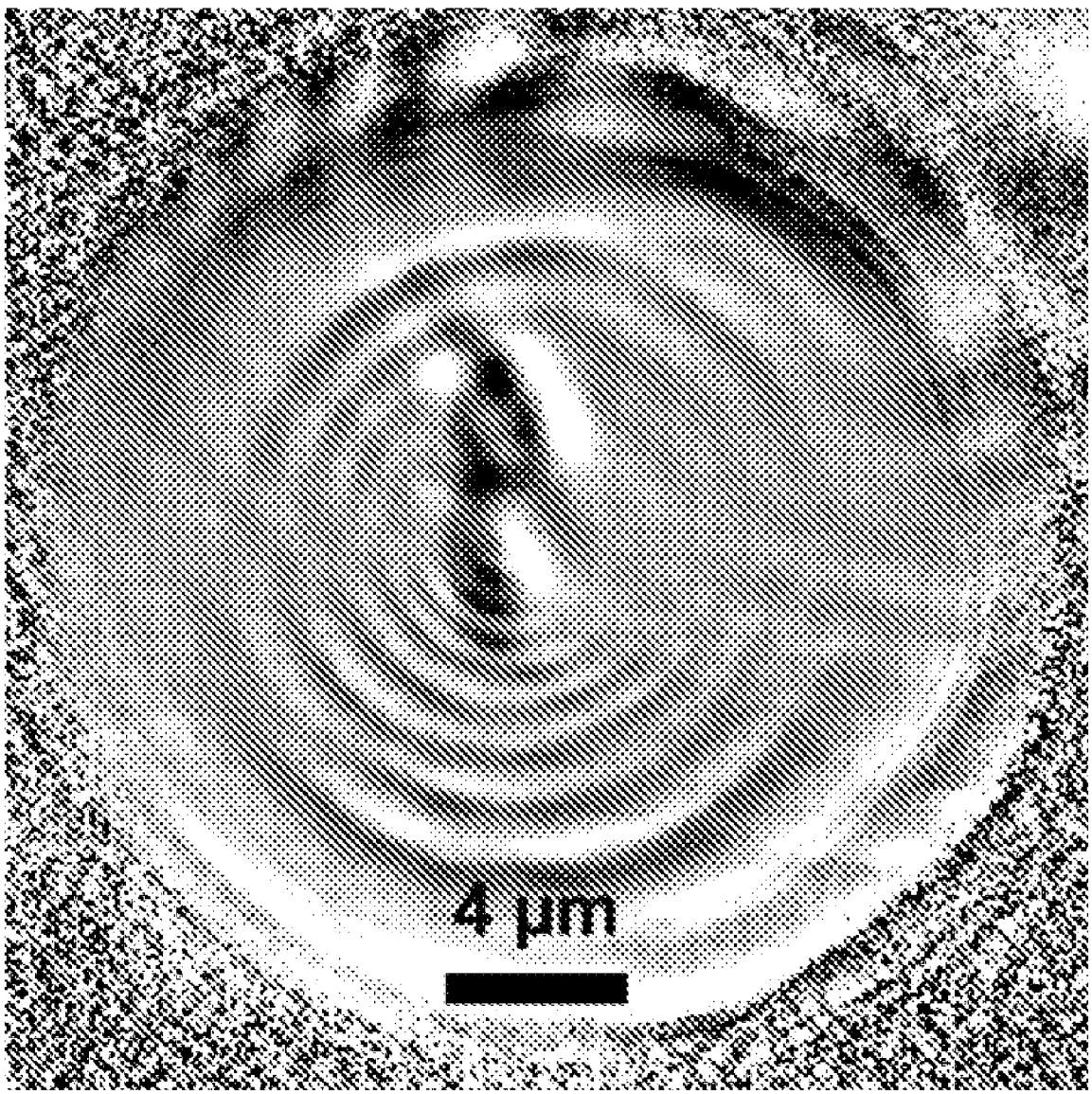
FIG. 4 is an x-ray spiral phase contrast micrograph of the same diatom in FIG. 3 and using the same apparatus, but with the diffuser absent from the apparatus.
Figure 5:
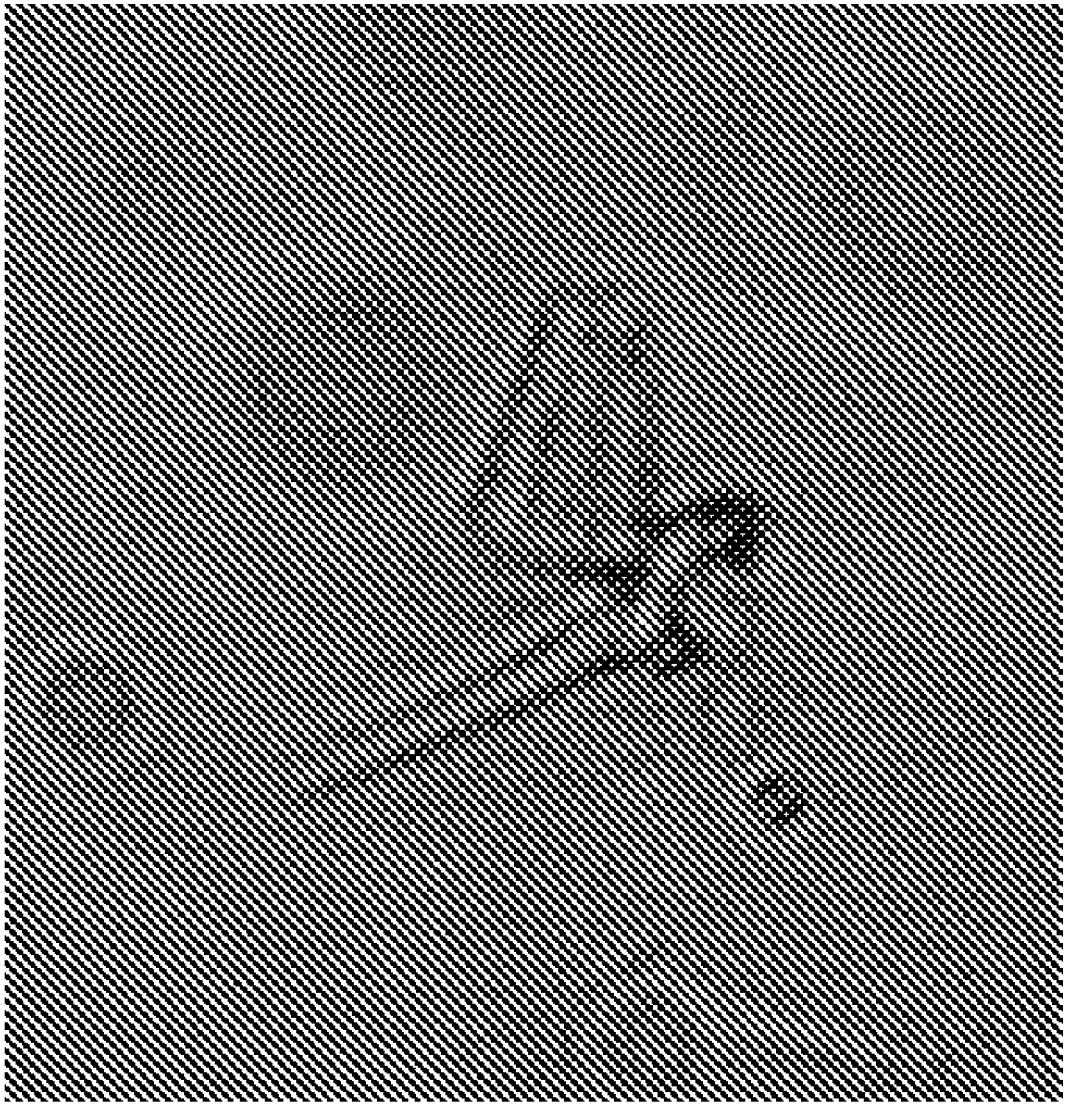
FIG. 5 is a visible light micrograph in absorption contrast of a similar diatom on the same 100-nm formvar substrate.

FIGS. 3 and 4 show x-ray spiral phase contrast images of a silicaceous diatom taken with and without the diffuser 108 present respectively generally designated by the reference character 300, 400. FIG. 5 provides a visible light micrograph of a similar diatom on the same 100-nm thick formvar substrate generally designated by the reference character 500. As expected, the contrast was found to invert through the focus and varied slowly with the degree of defocus.

FIGS. 6, 7, 8, and 9 show X-ray spiral phase contrast and corresponding visible light images of additional samples consisting of two overlapping strands of spider silk and a 5 μm diameter latex sphere generally designated by the respective reference character 600, 700, 800, and 900. Each image 600, 700, 800, and 900 consists of the average of ten consecutive 1-min exposures normalized by the average of ten images recorded with the sample absent. The focal condition was verified by locating the point at which the contrast inverted by stepping the sample-SZP distance through several depths of field (4.1 mm). The apparent resolution in these images is ~1 μm, consistent with that expected (0.5 μm) for this SZP lens 102. Some blurring was experienced due to mechanical drift of the microscope components between exposures.

Figure 6:
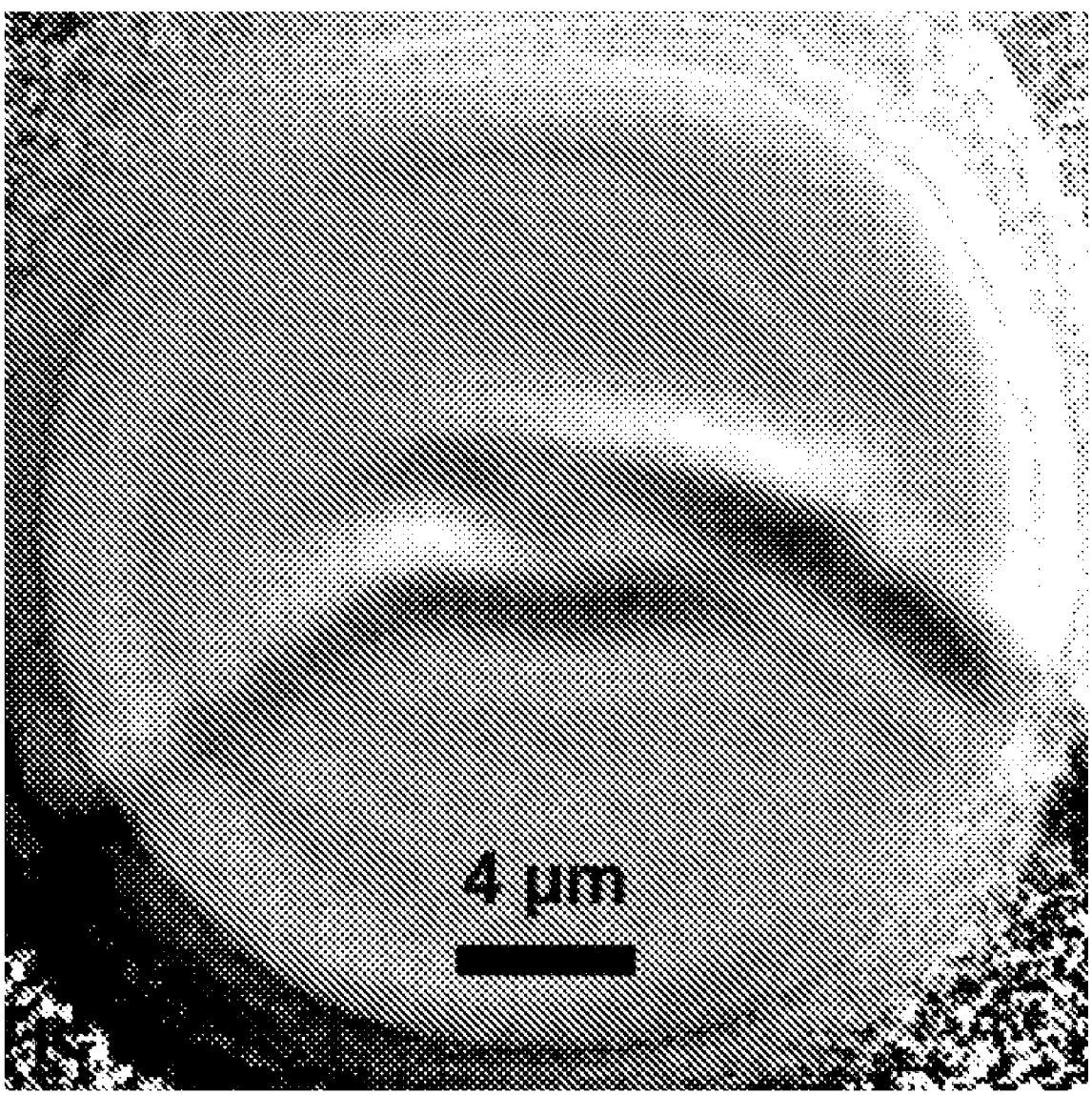
FIG. 6 is an x-ray spiral phase contrast image of two overlapping strands of common spider silk recorded at 9.1 keV.
Figure 7:
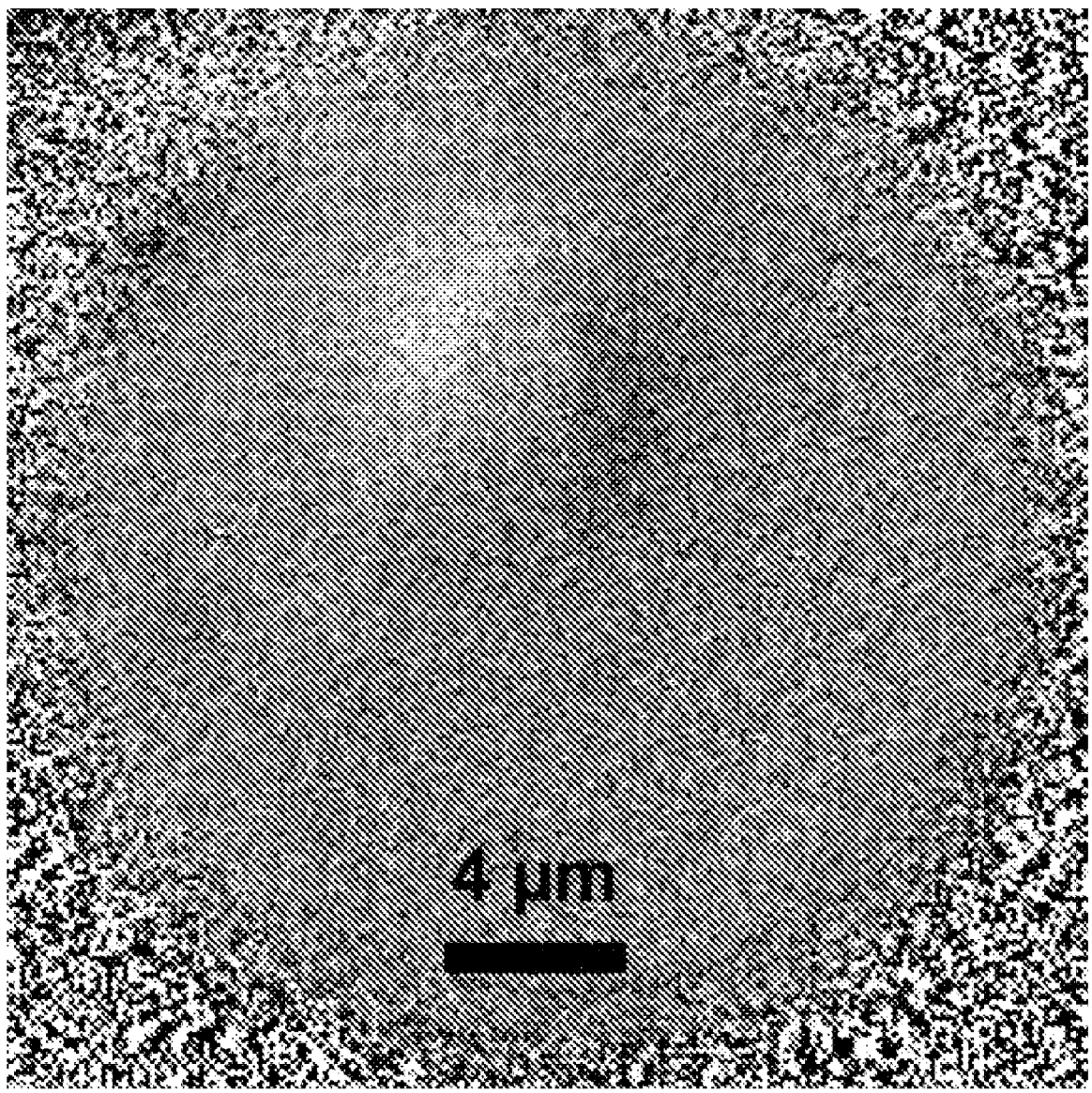
FIG. 7 is an x-ray spiral phase contrast image of a 5 μm diameter latex sphere recorded at 9.1 keV.
Figure 8:
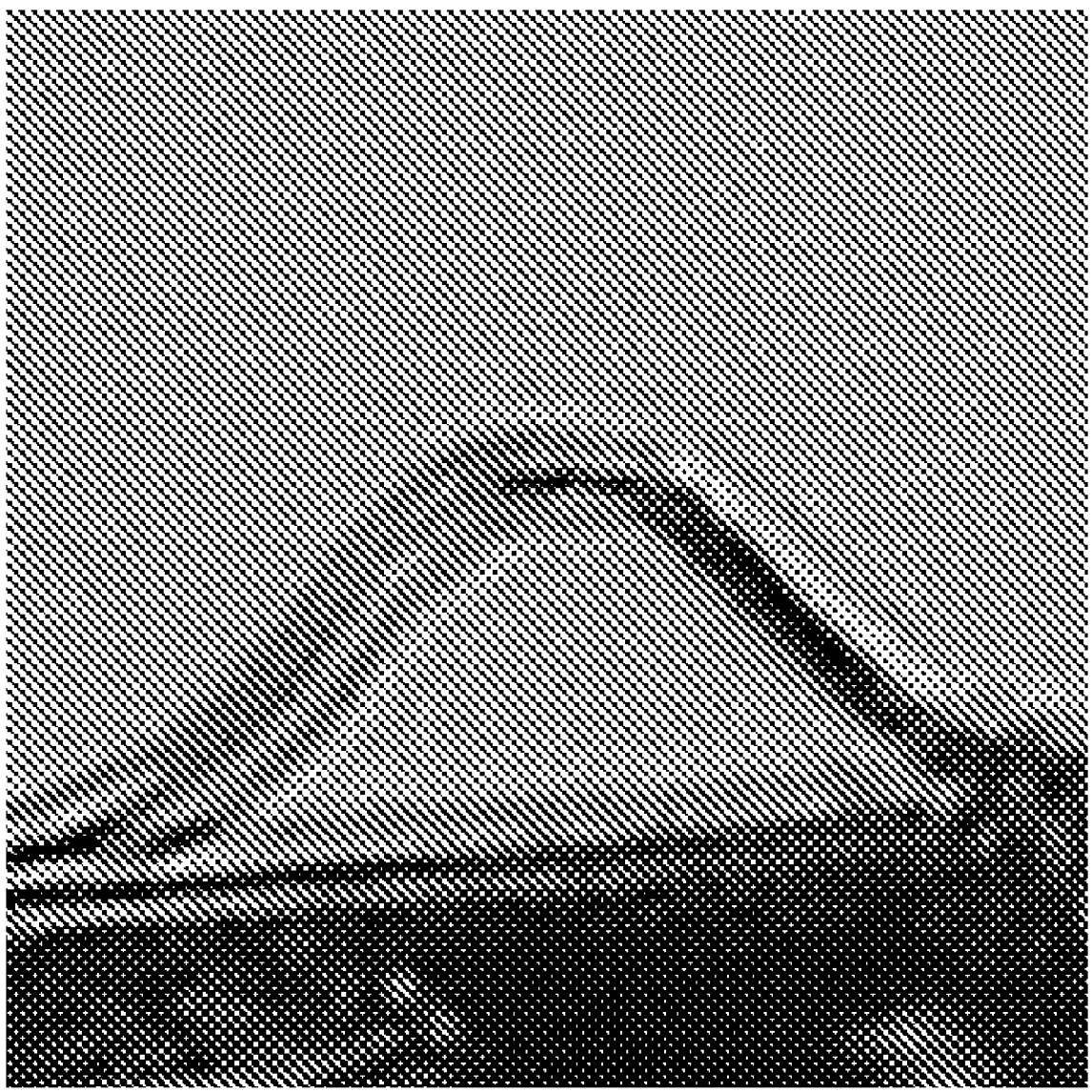
FIG. 8 is a visible light micrograph of the same two strands of spider silk illustrated in FIG. 6, but not at the same magnification.
Figure 9:
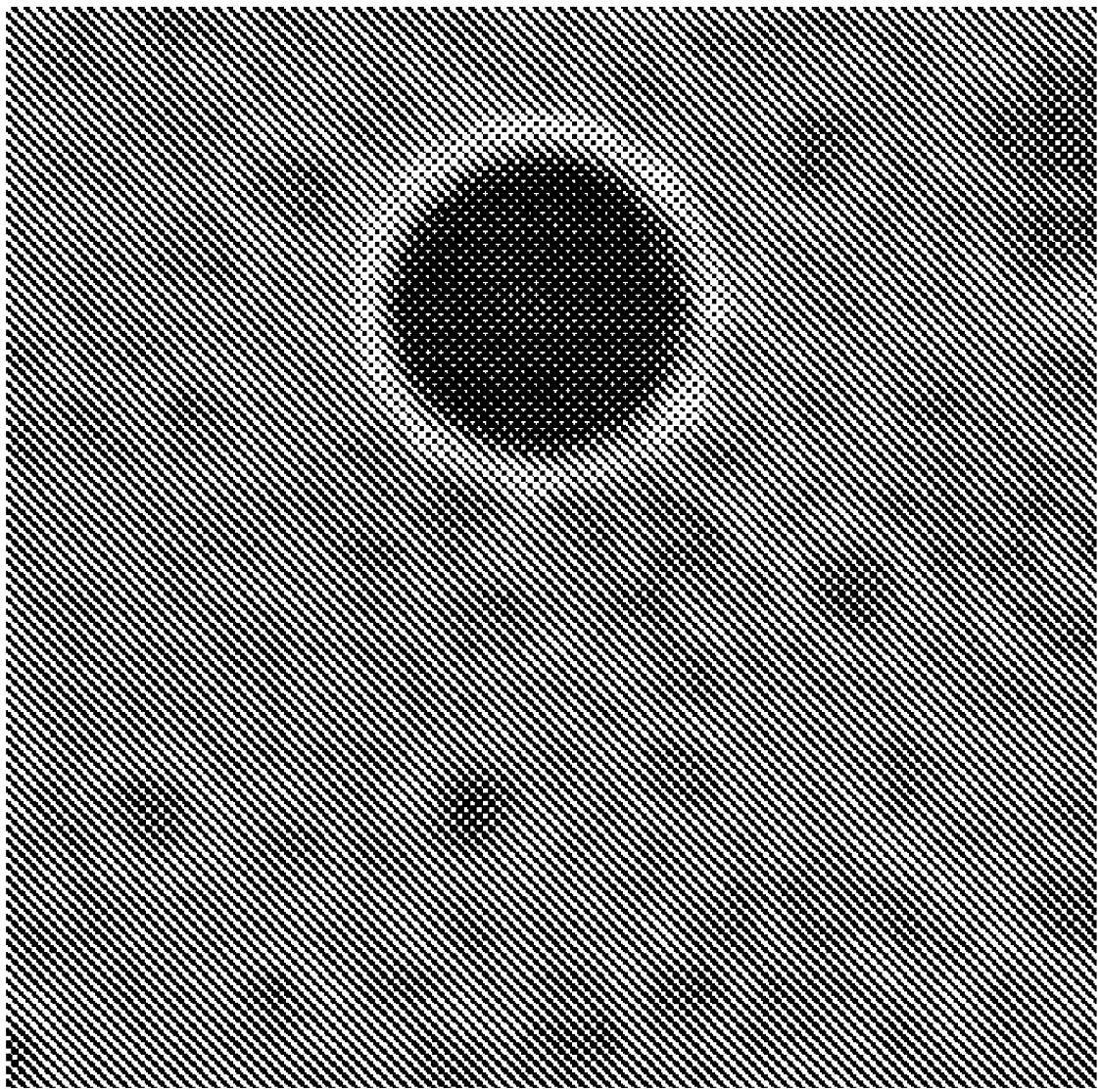
FIG. 9 is visible light micrograph of the same 5 μm diameter latex sphere illustrated in FIG. 7, but not at the same magnification.

At 9.1 keV the absorption lengths of bulk $SiO_2$ and carbon are about 0.2 mm and 1.5 mm, whereas the thicknesses λ/2δ that produce a phase shift of π are, respectively, 12.3 μm and 12.2 μm. Consequently considerably less than 1% absorption contrast is expected in the diatoms, spider silk, or latex spheres, which are 2-5 μm thick. It is evident the contrast in each of FIGS. 3, 6, and 7 is of order 50%, and the specimen edges, which appear as dark features surrounded by bright regions, are in qualitative agreement with the visible light micrographs. Although the specimen feature contrast shows a directional component, this is to be expected with the off-axis geometry of this demonstration.

It should be understood that a full-field x-ray microscope utilizing on-axis, hollow-cone illumination of the sample would allow fully isotropic phase imaging in accordance with the present invention.

Transmission x-ray microscopy is used for nanoscale imaging of biological specimens and ordered magnetic thin films with soft x-rays and denser structures such as interconnects in microelectronic devices with higher energy photons. Most high resolution transmission x-ray microscopes in use, including commercial instruments with Zernike phase contrast capability, use zone plate objectives.

While the resolution in this demonstration experiment is modest, there is no fundamental barrier to fabrication of SZP lens 102 in accordance with the present invention, which are manufactured using the known methods used to produce conventional zone plates, for example, with finest zones as small as 15 nm. Simply replacing the standard objective with an SZP in accordance with the present invention, as demonstrated here to combine the functions of focusing and forming the phase singularity into a single optical element, immediately provides existing instruments with phase contrast capability.

As this modification replacing the standard objective with an SZP lens 102 in accordance with the present invention is trivial it can be expected to have broad application. Moreover, this arrangement of replacing the standard objective with an SZP lens 102 in accordance with the present invention is more efficient and does not require insertion and alignment of a wavelength-specific phase ring between the objective and detector as for Zernike phase contrast.

Because little spatial coherence is required to image specimen feature edges by this method, it is also suited to low brilliance x-ray sources.

Lastly, it should be understood that this optical scheme of replacing the standard objective with an SZP in accordance with the present invention can be used for spiral phase imaging with other particles such as neutrons, atoms, and electrons.

While the present invention has been described with reference to the details of the embodiments of the invention shown in the drawing, these details are not intended to limit the scope of the invention as claimed in the appended claims.

What is claimed is:

1. An apparatus for implementing an enhanced phase contrast microscope comprising:
   an illumination source;
   a specimen illuminated by the illumination source;
   a focusing vortex lens used for an objective lens for the phase contrast microscope; said focusing vortex lens spaced a first set distance from the specimen;
   said focusing vortex lens defined by a single optical element diffractive spiral zone plate (SZP) lens; said diffractive spiral zone plate (SZP) lens having a predefined radius and phase-shifting spiral zones with a predefined finest zone width;
   an x-ray sensitive camera spaced a second predefined distance from said SZP lens; said first set distance and said second predefined distance being selectively provided for a focal condition based upon said predefined radius and said predefined finest zone width of said SZP lens; said x-ray sensitive camera includes a charge coupled device (CCD) camera;
   said SZP lens focusing and imparting a helical phase to incident illumination to image the specimen spiral phase contrast; said helical phase providing specimen imaging with azimuth-independent phase contrast without using additional optics in the phase contrast microscope; and
   said SZP lens including diametrically opposite regions having opposite phase canceling on-axis, and said SZP lens imaging off-axis of the specimen onto said charge coupled device (CCD) camera; and said CCD camera detecting the specimen image.

2. The apparatus for implementing an enhanced phase contrast microscope as recited in claim 1 includes a pinhole located between said illumination source and the specimen.

3. The apparatus for implementing an enhanced phase contrast microscope as recited in claim 2 wherein said pinhole defines a sample field of view.

4. The apparatus for implementing an enhanced phase contrast microscope as recited in claim 1 includes a rotating diffuser located between said illumination source and the specimen.

5. The apparatus for implementing an enhanced phase contrast microscope as recited in claim 4 wherein said rotating diffuser producing spatially incoherent illumination.

6. The apparatus for implementing an enhanced phase contrast microscope as recited in claim 1 includes a beam stop positioned between said SZP lens and said charge coupled device (CCD) camera.

7. The apparatus for implementing an enhanced phase contrast microscope as recited in claim 1 wherein said SZP lens has a spiral pattern formed of metal on an x-ray transparent substrate, providing a focal spot size of about 400 nm.

8. The apparatus for implementing an enhanced phase contrast microscope as recited in claim 1 wherein said SZP lens includes a pattern formed of gold on a silicon nitride substrate.

9. The apparatus for implementing an enhanced phase contrast microscope as recited in claim 8 wherein said pattern formed of gold on said silicon nitride substrate is formed by electron-beam nanolithography.

10. The apparatus for implementing an enhanced phase contrast microscope as recited in claim 8 wherein said silicon nitride substrate includes an approximately 50-nm thick membrane and said pattern formed of gold on said silicon nitride substrate is approximately 1 μm thick.

11. The apparatus for implementing an enhanced phase contrast microscope as recited in claim 1 wherein said SZP lens includes a pattern formed of nickel on a substrate.

12. The apparatus for implementing an enhanced phase contrast microscope as recited in claim 1 wherein said SZP lens is used with said illumination source selectively provided in an x-ray range from approximately 0.2 keV to 20 keV.

13. The apparatus for implementing an enhanced phase contrast microscope as recited in claim 1 wherein said SZP lens is used with said illumination source implemented by an electron source.

14. The apparatus for implementing an enhanced phase contrast microscope as recited in claim 1 wherein said SZP lens is used with said illumination source implemented by a neutron source.

15. The apparatus for implementing an enhanced phase contrast microscope as recited in claim 1 wherein said SZP lens is used with said illumination source implemented by visible light.

16. A method for implementing an enhanced phase contrast microscope comprising the steps of:
   providing an illumination source illuminating a specimen;
   positioning a focusing vortex lens spaced a first set distance from the specimen; said focusing vortex lens used for an objective lens for the phase contrast microscope; said focusing vortex lens defined by a single optical element diffractive spiral zone plate (SZP) lens ; said diffractive spiral zone plate (SZP) lens having a predefined radius and phase-shifting spiral zones with a predefined finest zone width; and
   providing a charge coupled device (CCD) camera spaced a predefined distance from SZP lens; said first set distance and said second predefined distance being selectively provided for a focal condition based upon said predefined radius and said predefined finest zone width of said SZP lens; said SZP lens focusing and imparting a helical phase to the incident illumination to image the specimen onto the CCD camera; and said helical phase providing specimen imaging with azimuth-independent phase contrast without using additional optics in the phase contrast microscope; and
   providing diametrically opposite regions having opposite phase canceling on-axis included in said SZP lens, and said SZP lens imaging off-axis of the specimen onto said charge coupled device (CCD) camera; and said CCD camera detecting the specimen image.

17. The method for implementing an enhanced phase contrast microscope as recited in claim 16 wherein providing said illumination source includes providing an x-ray source having a range from approximately 0.2 keV to 20 keV.

* * * * *